(12) United States Patent
Shea

(10) Patent No.: US 11,534,783 B2
(45) Date of Patent: Dec. 27, 2022

(54) RELEASE AGENT SPRAY SYSTEM FOR TEMPORARY TAPE REMOVAL MACHINE

(71) Applicant: James P. Shea, Waterford, MI (US)

(72) Inventor: James P. Shea, Waterford, MI (US)

( * ) Notice: Subject to any disclaimer, the term of this patent is extended or adjusted under 35 U.S.C. 154(b) by 395 days.

(21) Appl. No.: 16/909,903

(22) Filed: Jun. 23, 2020

(65) Prior Publication Data
US 2021/0394211 A1 Dec. 23, 2021

(51) Int. Cl.
*B05B 9/04* (2006.01)
*B05B 9/01* (2006.01)
*B05B 9/00* (2006.01)

(52) U.S. Cl.
CPC .............. *B05B 9/0426* (2013.01); *B05B 9/01* (2013.01); *B05B 9/007* (2013.01)

(58) Field of Classification Search
CPC ... B05B 9/0855; B05B 9/0861; B05B 9/0426; B05B 9/007; B05B 9/01
USPC ....... 239/332, 525, 526, 530, 532, 588, 175, 239/390; 222/538
See application file for complete search history.

(56) References Cited

U.S. PATENT DOCUMENTS

| | | | | |
|---|---|---|---|---|
| 3,904,116 A * | 9/1975 | Jones | .................... | B05B 9/0866 239/332 |
| 4,621,770 A * | 11/1986 | Sayen | .................... | B05B 9/007 239/332 |
| 4,801,088 A * | 1/1989 | Baker | .................. | B05B 9/0861 239/332 |
| 4,865,255 A * | 9/1989 | Luvisotto | ............ | A01M 7/0035 239/172 |
| 7,909,265 B2 * | 3/2011 | Adams | .................. | A01M 21/04 239/172 |
| 10,112,794 B1 * | 10/2018 | Shea | ....................... | E01C 23/08 |
| 2003/0230643 A1 * | 12/2003 | Bugarin | .................... | B05B 1/16 239/390 |
| 2005/0082389 A1 * | 4/2005 | Sanchez | ................. | A62C 17/00 239/526 |
| 2007/0170281 A1 * | 7/2007 | Cooper | .................. | B60K 15/03 239/526 |

* cited by examiner

*Primary Examiner* — Steven J Ganey

(57) ABSTRACT

A release agent spray system for a vehicle that is used for removing temporary tape from pavement surfaces. The release agent spray system includes a reservoir containing a release agent, a pump for pumping release agent from the reservoir, and a handheld sprayer connected to the reservoir by a fluid conduit or tube and connected electrically to the pump. The handheld sprayer includes an activation switch for activating the pump to deliver release agent from the reservoir to the handheld sprayer.

15 Claims, 4 Drawing Sheets

RELEASE AGENT SPRAY SYSTEM FOR TEMPORARY TAPE REMOVAL MACHINE

BACKGROUND

The present invention relates generally to machines that are designed to remove temporary marking tapes from roads, airport runways, parking lots, bicycle paths and other paved surfaces. More particularly the present invention relates to a release agent spray system for such machines.

The present inventor was granted U.S. Pat. No. 10,112,794 on Oct. 30, 2018 which discloses a Motorized Tape Removal Apparatus (MTRA) that is designed and constructed to remove and handle temporary lane marking tape that has been removed in a manner that reduces the amount of labor and time it has taken in the past to remove and handle the tape.

U.S. Pat. No. 10,112,794 discloses that the MTRA includes a spool assembly that can be positioned on either side of the MTRA. The spool assembly includes a rotatable spool upon which used temporary tape is wound during a tape removing process. The spool is rotated by a drive means such as a hydraulic motor. The spool assembly includes a disposable core upon which the used tape is wound. After a tape removal process the disposable core having the used tape wound thereon can be disposed of.

Removing temporary tape from a surface such as a pavement can be achieved by simply pulling the tape by force. When such tape is removed manually by hand and too much pulling force is used, the tape can break. During such a manual tape removing process, if the tape breaks, the worker merely resumes pulling the tape up from the point at which it broke.

During the course of the present invention in which a MTRA is used to remove temporary tape, it has been discovered that the use of a release agent applied to portions of the tape can improve the removal of used tape by an MTRA.

The present invention provides a release agent spray system for an MTRA that includes a reservoir of a release agent and a handheld sprayer that an operator of a MTRA can easily access and which handheld sprayer is conveniently stored for use on a MTRA.

BRIEF SUMMARY

According to various features, characteristics and embodiments of the present invention which will become apparent as the description thereof proceeds, the present invention provides an improvement for a vehicle for removing temporary tape that comprises a chassis having fixed and guiding wheels, a spool assembly including a rotatable spool assembly for winding used temporary tape thereon, a spool assembly support mounted to the chassis and supporting the spool assembly above the chassis, and controllable drive means to rotate the rotatable spool, the improvement comprising a release agent spray system which comprises:

a reservoir containing a release agent;

a pump for pumping release agent from the reservoir; and a handheld sprayer connected to the reservoir by a fluid conduit or tube and connected electrically to the pump, the handheld sprayer including an activation switch for activating the pump to deliver release agent from the reservoir to the handheld sprayer.

The fluid conduit or tube and electrical connection between the handheld sprayer and pump can extend in a flexible sheath that is attached to the handheld sprayer.

The reservoir and pump can be located remotely from the handheld sprayer and the pump can be located externally to the reservoir of internally in the reservoir.

In one embodiment the reservoir and pump are located beneath or behind a seat of the vehicle.

A holder can be provided on the vehicle for holding the handheld sprayer in an accessible location on the vehicle. In one embodiment the handheld sprayer can include structure for engaging the holder.

In one embodiment the handheld sprayer comprises a linear wand shape that can have a spray nozzle at the front of the handheld sprayer and the activation switch provided on a side of the handheld sprayer. The spray nozzle can be removable and replaceable.

On some embodiments a relay can be provided that is electrically connected between the activation switch and the pump.

The handheld sprayer can include an internal fluid passageway that connects the fluid conduit or tube to a spray nozzle port provided in the handheld sprayer and a separate internal wiring passageway has wires that pass therethrough which provide electrical connection between the pump and the activation switch.

The body of the handheld sprayer includes a body can consists of a metal.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

Figure 3:
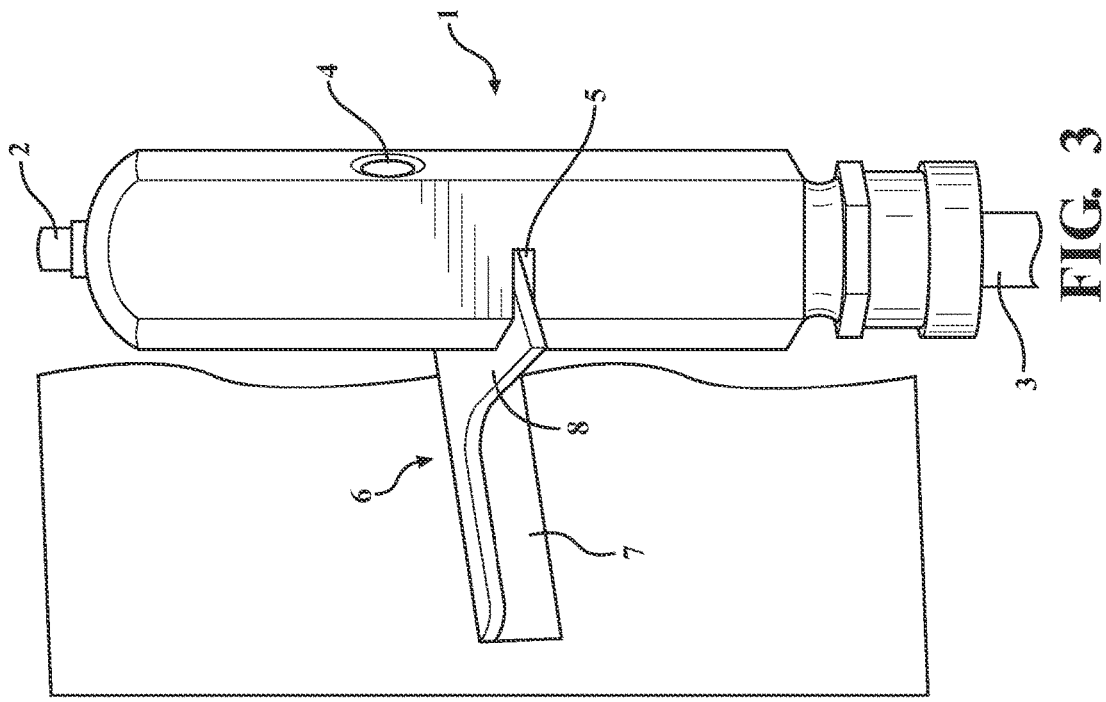
FIG. 3 is a perspective view of the handheld sprayer of FIG. 1 coupled to a holder on an MTRA according to one embodiment of the present invention.

As noted above, the present invention provides a release agent spray system for an MTRA that includes a reservoir of a release agent and a handheld sprayer that an operator of a MTRA that easily access and which handheld sprayer is conveniently stored for use on a MTRA. The reservoir used for the release spray systems of the present invention can be a conventional automotive windshield washer reservoir with an integrated internal or external electric pump. Such a reservoir comprises a plastic container that is provided with a sealable access opening for replenishing fluid into the container.

The release agent reservoir of the present invention should be of a size and configuration to fit in a convenient location on the MTRA, for example under or behind the seat or in a column that supports the steering mechanism.

The pump can be a conventional pump that is typically integrated in or on a windshield washer fluid reservoir. The use of such a low voltage pump, of the type used in windshield washer systems, provides an on-demand supply of release agent from the reservoir to a handheld sprayer by merely pressing an actuator switch, button, trigger, etc. on the handheld sprayer.

The handheld sprayer is coupled to the release agent reservoir by a flexible fluid conduit or tube through which release agent in the reservoir is supplied to the handheld sprayer. The handheld sprayer is also electrically coupled to the pump by electrical wires that are connected to the actuator switch of the handheld sprayer.

According to the present invention both the flexible fluid conduit or tube through which release agent is supplied to the handheld sprayer and the electrical wires that operate the pump extend in a flexible sheath from the release agent reservoir and pump to the handheld sprayer. The flexible sheath and flexible fluid conduit or tube and electrical wires contained therein are of sufficient length to allow an operator of the MTRA to spray release agent on a desired area.

The handheld sprayer can have any convenient shape, including but not limited to a those having non-linear handles and nozzles, those with pistol-type grips and triggers, those with actuator rocker switches, those with push button switches, those that have linearly aligned handles and nozzles, and various combinations of these and other types of shapes.

The handheld sprayer is provided with at least one spray nozzle. The spray nozzle(s) can be configured to produce any desired spray pattern and can be removable and replaceable with a spray nozzle that produces the same or a different spray pattern.

According to one embodiment of the present invention the handheld sprayer is a linear shaped spray wand that is provided with a spray nozzle on a front end and has the flexible sheath with the flexible fluid conduit or tube and electrical wires contained therein attached to the opposite end.

The release agent spray system of the present invention further provides a holder for the handheld sprayer which can have any convenient configuration such as a cradle, basket, receptacle, yoke, resilient snap-in holder, etc. which can be provided in a convenient location on the MTRA. In further embodiments the handheld sprayer can be provided with a metal ring, chain, loop, etc. by which the handheld sprayer can be hung on a hook provided on the MTRA.

Figure 1:
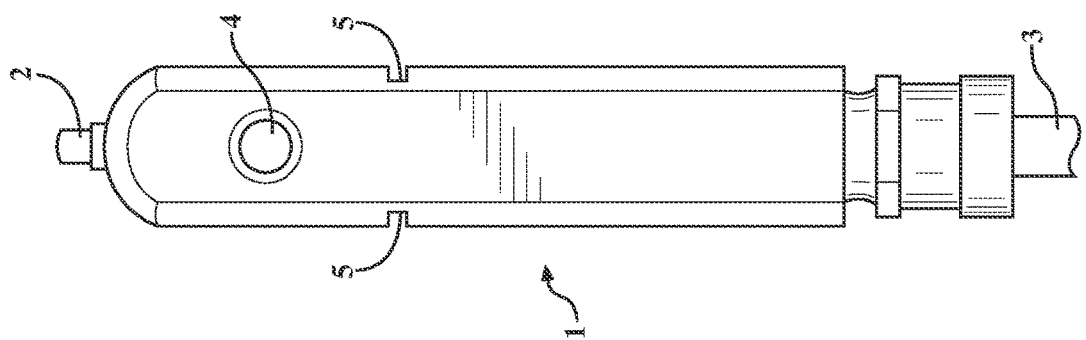
FIG. 1 is front view of a handheld sprayer according to one embodiment of the present invention.
Figure 4:
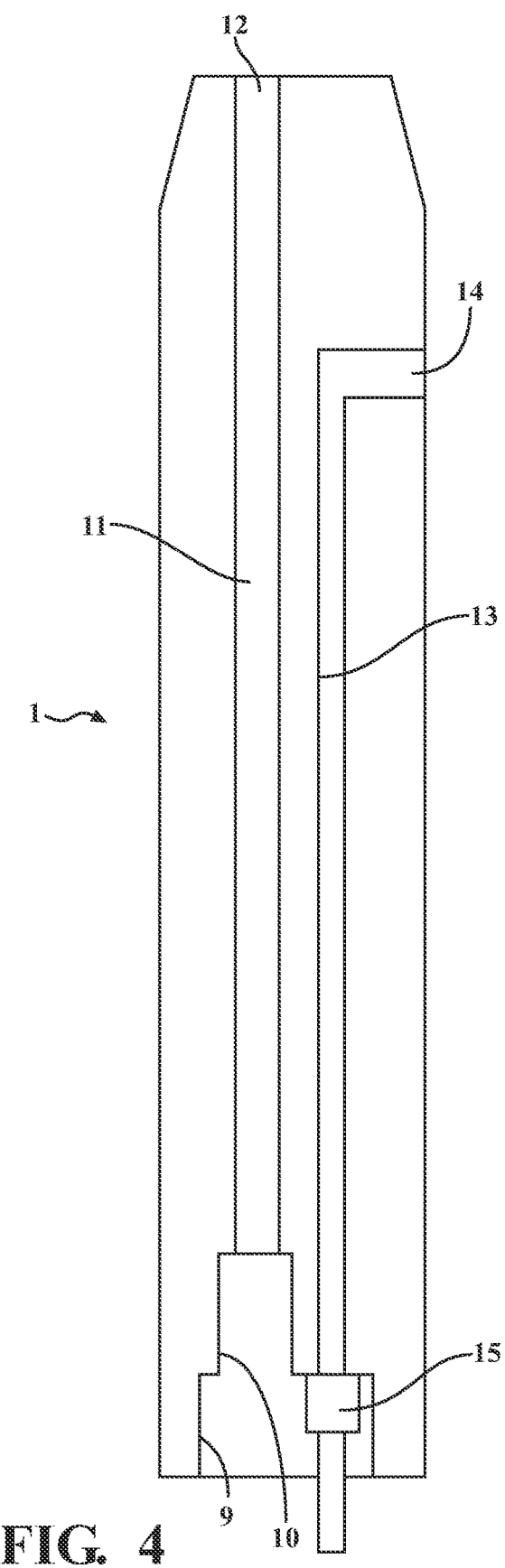
FIG. 4 is a side sectional view of a handheld sprayer according to one embodiment of the present invention.
Figure 5:
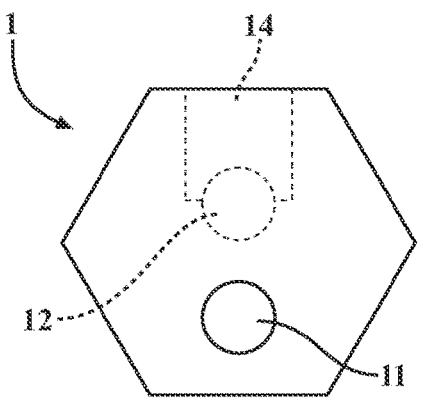
FIG. 5 is a front sectional view of the handheld sprayer of FIG. 4.

FIG. 1 is front view of a handheld sprayer according to one embodiment of the present invention.

In the embodiment of the invention shown in FIG. 1 the handheld sprayer is a spray wand 1 having a hexagonal cross-sectional shape with a spray nozzle 2 in the front and a flexible sheath 3 (containing a flexible fluid conduit or tube and electrical wires that extend from the reservoir and pump) connected to the back. The body of the spray wand 1 is of a convenient size to be held by a worker's hand and can be an inch and a half in diameter or larger and seven inches long or longer. While the body of the spray wand 1 in FIG. 1 has a hexagon cross-sectional shape, it is to be understood that the body of the spray wand 1 can have other cross-sectional shapes including, but not limited to circular, rectangular, ovular, etc. In addition, while the cross-sectional shape of the body of the spray wand 1 is shown as being uniform along the length of the spray wand 1, the cross-sectional shape can very both dimensionally and in cross-sectional shape along the length of the spray wand 1.

As show in the front view, the spray wand 1 includes an activation button 4 that a user can press to operate the pump and cause release agent to be sprayed from the spray nozzle 2. As noted above, in other embodiments, the activation switch of the spray wand 1 could be other than a button 4 as shown in FIG. 1.

In the embodiment of the spray wand 5 shown in FIG. 1 portions of a slot 5 are formed at least in the sides of the body of the spray wand 1. As described below in reference to FIG. 3, these slot portions 5 are provided so that the spray wand 1 can be held in a holder for convenient access by an operator of a MTRA.

Figure 2:
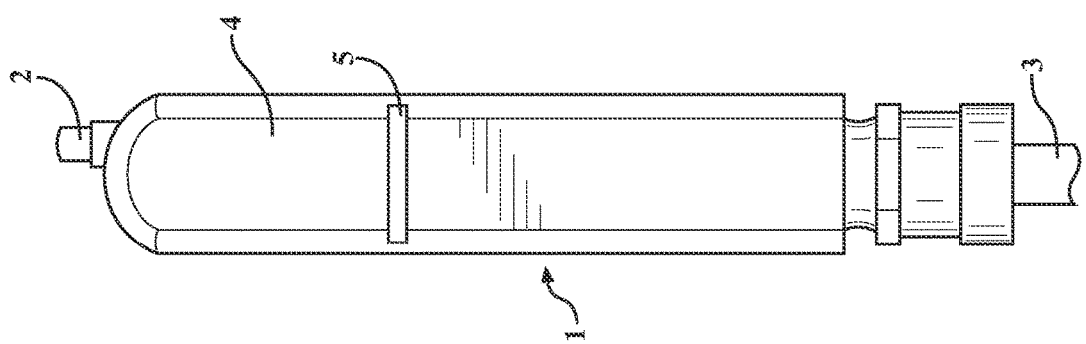
FIG. 2 is rear view of the handheld sprayer of FIG. 1.

FIG. 2 is rear view of the handheld sprayer of FIG. 1. As shown in FIG. 2, the slot portions 5 shown in FIG. 1 are actually portions of a continuous slot 5 that extends across the back side and sides of the spray wand 1. This continuous slot is dimensioned to engage cooperatively with a holder 6 as discussed below.

FIG. 3 is a perspective view of the handheld sprayer of FIG. 1 coupled to a holder on an MTRA. In FIG. 3 a holder or holding structure 6 for the spray wand 1 is provided in a convenient location on an MTRA. In the embodiment shown, the holder 6 comprises a bracket 7 with a pair of spaced apart extensions 8 which are configured so that the slot 5 formed in the body of the spray wand 1 can engage extensions 8 of bracket 7 to hold the spray wand 1 in the holder 6. As discussed above, in alternative embodiments the holder for the spray wand 1 can have any convenient configuration such as a cradle, yoke, resilient snap in holder, etc. which can be provided in a convenient location on the MTRA. Further in other embodiments the spray wand 1 can be provided with a metal ring, chain, loop, etc. by which the handheld sprayer can be hung on a hook provided on the MTRA.

FIG. 4 is a side sectional view of a handheld sprayer according to one embodiment of the present invention. FIG. 5 is a front sectional view of the handheld sprayer of FIG. 4. The handheld sprayer of FIGS. 4 and 5 can have the hexagon cross-sectional shape of the spray wand 1 of FIGS. 1-3, or another other cross-sectional shape as discussed above.

At the bottom of the spray wand 1 a centrally located internally threaded bore 9 is provided. At the bottom of this centrally located internally threaded bore 9 (or at the "top" as shown in FIG. 4) a smaller diameter internally threaded bore 10 extends upward into the body of the spray wand 1. The smaller diameter internally threaded bore 10 connects to a fluid passageway 11 that extends to opening 12 formed in the front of the body of the spray wand 1. The centrally located larger diameter internally threaded bore 9 connects to a wiring passageway 13 that extends to an opening 14 in the front of the spray wand 1 where the activation button 4 will be provided (See FIG. 6).

Below the wiring passageway 13 and at the bottom of the centrally located larger diameter internally threaded bore 9 an electric press fit coupling element 15 is provided that seals the electrical wiring leads in wiring passageway 13 as discussed above.

FIG. 6 is an exploded view of the handheld sprayer according to one embodiment of the present invention. In FIG. 6 a small threaded connector fitting 16 is shown as being aligned with the smaller diameter internally threaded bore 10 that connects to the fluid passageway 11. The small threaded connector fitting 16 attaches the end of the flexible fluid conduit contained in the flexible sheath 3 to the fluid passageway 11 and includes a sealing element (not shown) in the bottom that seals the flexible fluid conduit so that fluid (i.e. release agent) pumped from the release agent reservoir only flows into and through fluid passageway 11 in spray wand 1.

Figure 6:
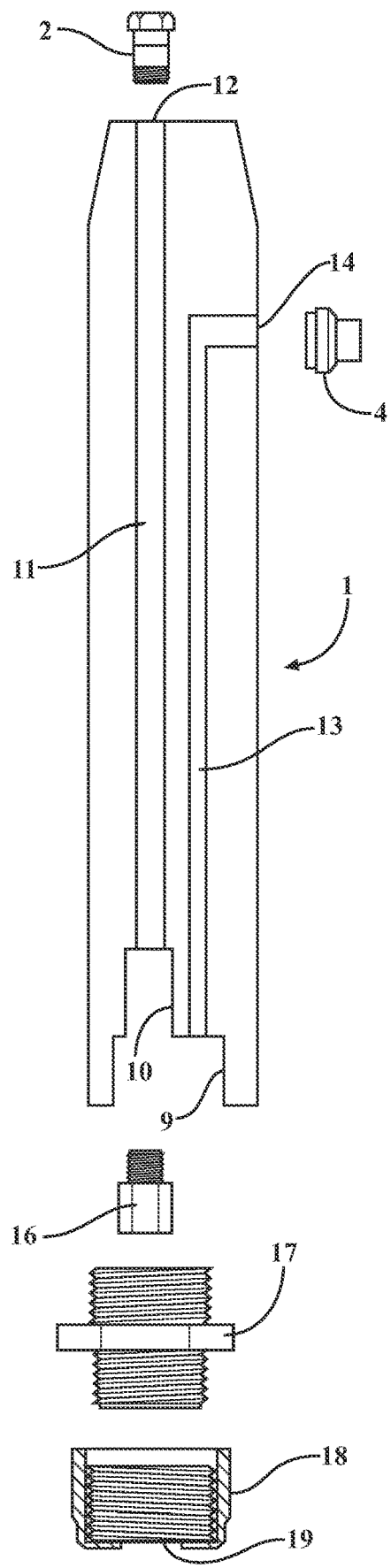
FIG. 6 is an exploded view of the handheld sprayer according to one embodiment of the present invention.

Below that small threaded connector 16 in FIG. 6 is a larger threaded coupler 17 that is configured to be received in the centrally located larger diameter internally threaded bore 9. The flexible sheath 3 containing the flexible fluid conduit or tube from the release agent reservoir and the electrical wires from the pump extends into and though the larger threaded coupler 17 and into the bottom of the spray wand 1 at which junction the electrical wires pass through wiring passageway 13 via the press fit coupling element 15 in sealed manner and the flexible fluid conduit or tube is connected to the fluid passageway 11 via the small threaded connector 16 in a sealed manner.

At the very bottom of FIG. 6 an internally threaded cap 18 is show which can be screwed onto the bottom of larger threaded coupler 17. The cap 18 has an opening 19 through which the end of the flexible sheath 3 passes. The end of flexible sheath 3 passes through a compression gasket element (not shown) provided at the bottom of larger threaded coupler 17. Tightening internally threaded cap 19 onto the bottom of the larger threaded coupler 17 compresses the compression gasket element and secures the flexible sheath 3 to the bottom of the spray wand 1.

In FIG. 6, activation button 4 is shown as being aligned with opening 14 into which activation button 4 is installed and connected to electrical wires that pass through wiring passageway 13. Also as shown in FIG. 6, spray nozzle 2 is shown as being aligned with opening 12 into which spray nozzle 2 is installed. As noted above, the spray nozzle 2 can be removable and replaceable for example by providing opening 12 with internal threads and the bottom of spray nozzle 2 with complementary external threads.

Figure 7:
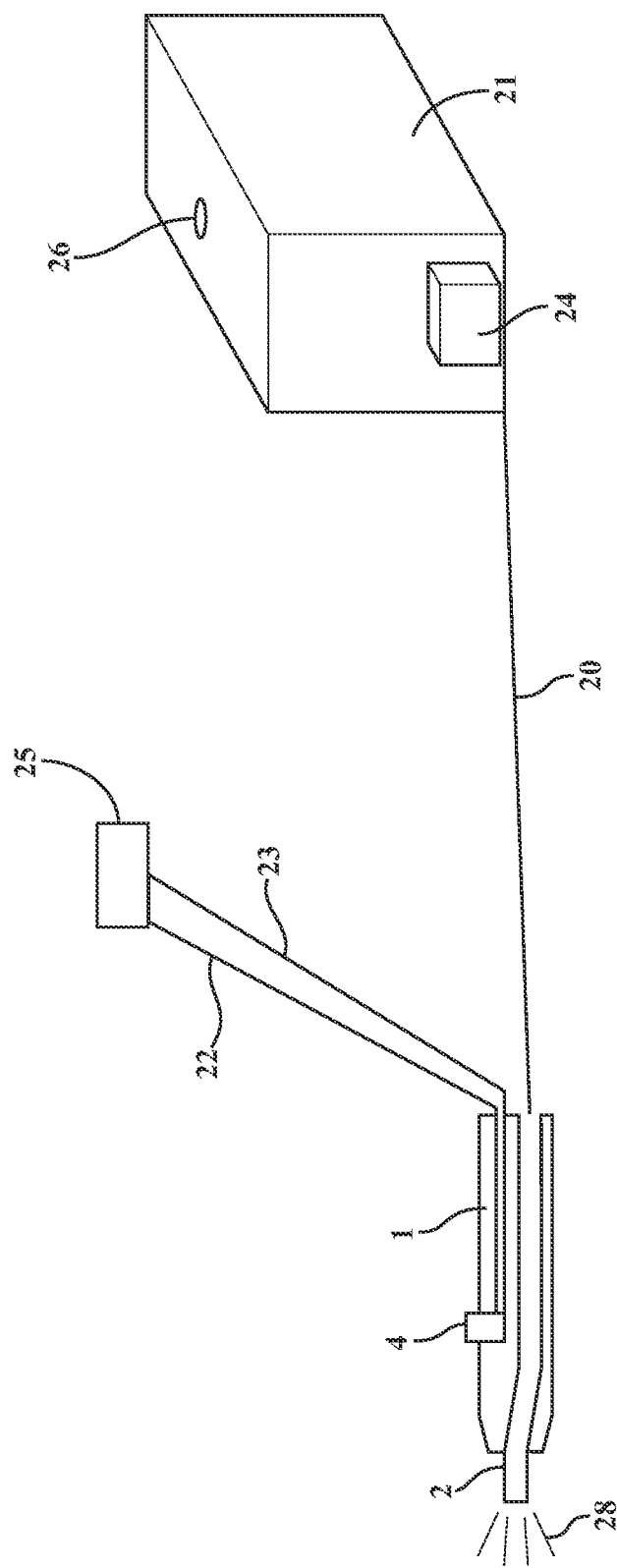
FIG. 7 is a schematic diagram of the fluid and electrical configuration of a release agent spray system according to the present invention.

FIG. 7 is a schematic diagram of the fluid and electrical configuration of a release agent spray system according to the present invention. As indicated in FIG. 7 the fluid conduit or tube 20 that is contained in flexible sheath 3 extends between release agent reservoir 21 and spray wand 1. The electrical wires 22, 23 that operate pump 24 to cause pump 24 to deliver release agent from the reservoir 21 to spray wand 1 via fluid conduit or tube 20 are connected to an electrical relay 25 that turns pump 24 on and off. The relay 25 is then connected to the activation switch 4 on the spray wand 1 so that when the activation switch 4 on spray wand 1 is operated, the relay 25 in turn operates pump 24. The relay 25 can be positioned near pump 24 so that the wire connection between relay 25 and pump 24 does not extend through flexible sheath 3. In FIG. 7 the filler cap 26 of the release agent reservoir 21 is depicted which should be in an accessible location. When activation button 4 is pressed release agent is ejected from the front of spray wand 1 via spray nozzle 2 in a spray pattern 28.

During the process of removing used temporary tape from a pavement surface the operator of a MTRA can, at any desired time, remove the handheld sprayer from its storage location and active the handheld sprayer to spray release agent on to a portion of tape. In the course of developing the present invention is was concluded that suitable release agents are those which can dissolve, solvate or breakdown the adhesive which secures the temporary tape to a pavement surface. Examples of release agents include, but are not limited to Pine-Sol®, Dawn dish soap and propylene glycol.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. In a vehicle for removing temporary tape that comprises a chassis having fixed and guiding wheels, a spool assembly including a rotatable spool assembly for winding used temporary tape thereon, a spool assembly support mounted to the chassis and supporting the spool assembly above the chassis, and controllable drive means to rotate the rotatable spool, the improvement comprising a release agent spray system assembled into and attached to the vehicle which release agent spray system comprises:

a reservoir containing a release agent, which release agent will dissolve, solvate or breakdown an adhesive which secures a temporary tape to a pavement surface;

a pump for pumping release agent from the reservoir, the pump being provided on or in the reservoir; and a handheld sprayer connected to the reservoir by a fluid conduit or tube and connected electrically to the pump, the handheld sprayer including an activation switch for activating the pump to deliver release agent from the reservoir to the handheld sprayer.

2. A vehicle for removing temporary tape according to claim 1, wherein the fluid conduit or tube and electrical connection between the handheld sprayer and pump extend in a flexible sheath that is attached to the handheld sprayer.

3. A vehicle for removing temporary tape according to claim 2, wherein the reservoir and pump are located beneath or behind a seat of the vehicle.

4. A vehicle for removing temporary tape according to claim 1, wherein the reservoir and pump are located remotely from the handheld sprayer.

5. A vehicle for removing temporary tape according to claim 1, further comprising a holder for holding the handheld sprayer in an accessible locator on the vehicle.

6. A vehicle for removing temporary tape according to claim 5, wherein the handheld sprayer includes structure for engaging the holder.

7. A vehicle for removing temporary tape according to claim 1, wherein the handheld sprayer comprises a linear wand shape.

8. A vehicle for removing temporary tape according to claim 7, wherein a spray nozzle is provided at the front of the handheld sprayer and the activation switch is provided on a side of the handheld sprayer.

9. A vehicle for removing temporary tape according to claim 8, wherein the spray nozzle is removable and replaceable.

10. A vehicle for removing temporary tape according to claim 1, wherein the pump is located externally to the reservoir.

11. A vehicle for removing temporary tape according to claim 1, wherein the pulp is located internally in the reservoir.

12. A vehicle for removing temporary tape according to claim 1, further comprising a relay that is electrically connected between the activation switch and the pump.

13. A vehicle for removing temporary tape according to claim 1, wherein the handheld sprayer includes an internal fluid passageway and a separate internal wiring passageway.

14. A vehicle for removing temporary tape according to claim 13, wherein the internal fluid passageway connects the fluid conduit or tube to a spray nozzle port provided in the handheld sprayer and the internal wiring passageway has wires that pass therethrough which provide electrical connection between the pump and the activation switch.

15. A vehicle for removing temporary tape according to claim 1, wherein the handheld sprayer includes a body that consists of a metal.

\* \* \* \* \*